Jan. 16, 1968  F. W. A. WARD  3,363,481
GEAR DRIVE
Filed Nov. 24, 1964
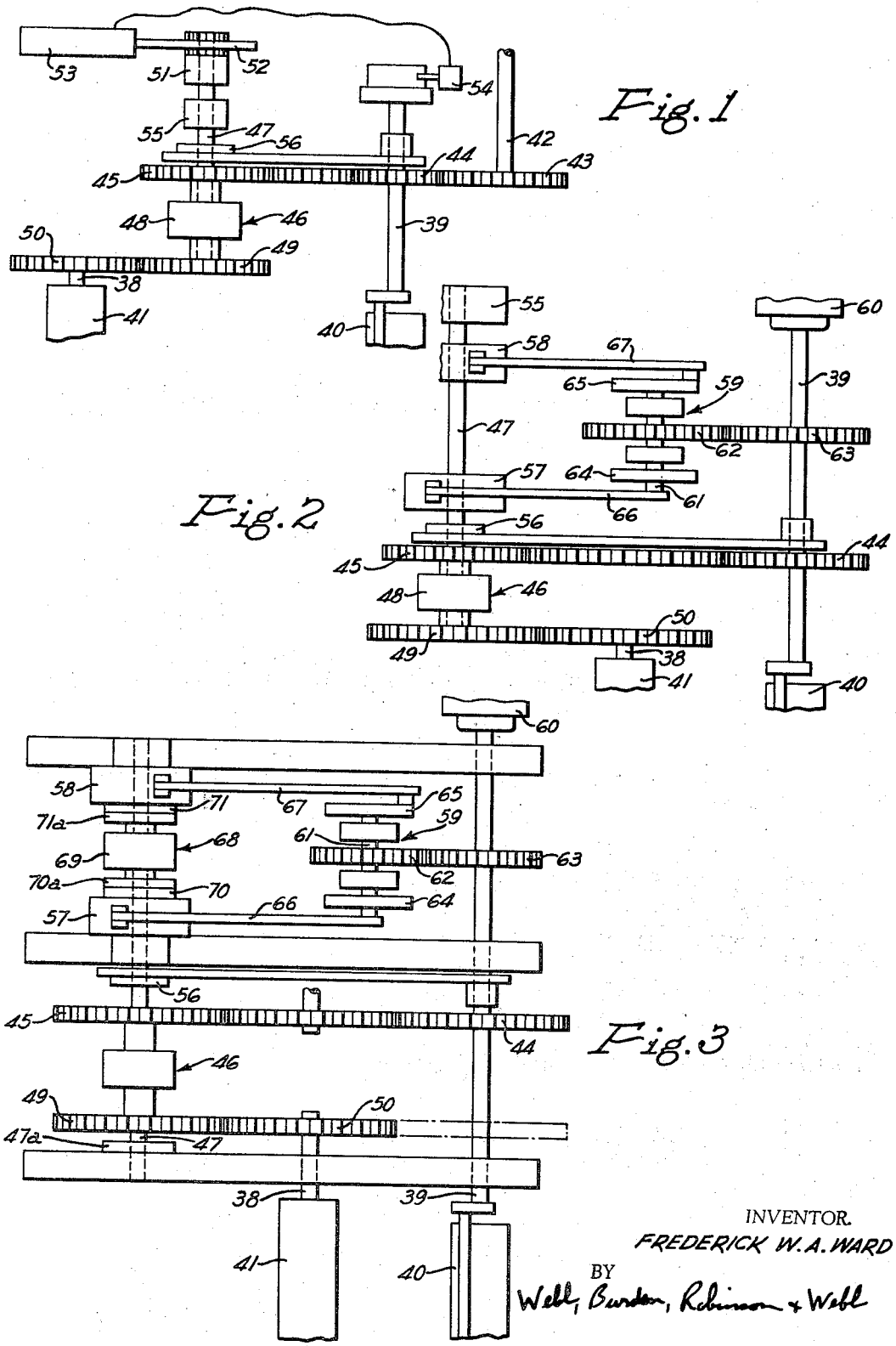
INVENTOR.
FREDERICK W. A. WARD
BY
Webb, Burden, Robinson & Webb
ATTORNEYS.

United States Patent Office 3,363,481
Patented Jan. 16, 1968

3,363,481
GEAR DRIVE
Frederick W. A. Ward, Zelienople, Pa., assignor to
Origineers Inc., Pittsburgh, Pa.
Filed Nov. 24, 1964, Ser. No. 413,590
13 Claims. (Cl. 74—675)

This invention relates to a variable speed gear drive which includes at least two output drive shafts and a differential with a case and side gears wherein one of the two output drive shafts is driven at a substantial constant speed by a power source and the other output drive shaft has its speed increased or decreased relative to that of the first mentioned drive shaft. This increase and decrease in speed of the other drive shaft occurs during at least a part of a revolution of the first mentioned drive shaft. At times during one or more revolutions of the two drive shafts, both are synchronized so that this gear drive has advantageous utility for a combination of a material feed machine and a work machine wherein the work machine performs repeated operations upon material at given time intervals and as the material travels at speeds of 200–1000 feet per minute from the feed machine to the work machine.

Preferably, such a combination of machines must have versatility of operation wherein the length of the material fed to the work machine by the feed machine is changeable to satisfy different requirements and to produce different products. Also, maintenance of a high degree of consistent dimensional accuracy between successive lengths of the material delivered to the work machine is mandatory for satisfaction of strict specifications.

One specific apparatus which effectively uses the gear drive is a pinch roll stand or a roller leveler and a shear or a stamping machine or press. The pinch roll stand or roller leveler feeds the material such as metal strip from a coil to the shear which cuts the strip into given lengths or to the stamping machine or press which forms or presses articles from the metal strip.

In a large number of material processing, fabricating, forming, printing, shearing, stamping, pressing, etc., lines which handle metal strip, paper, plastic, rubber or synthetic rubber, etc., the material is in long lengths or in coils many hundreds of feet in length. Most of these lines require that a feed machine or device, which advances the material to a work machine for shearing, stamping, pressing, fabricating, etc., the material be synchronized with the work machine. These work machines generally perform repeated operations upon the material as it is continuously fed thereto, and many of these operations are performed at intervals of fractions of a second and a few seconds between one another.

To render such lines versatile for variations and modifications in the shearing, stamping, pressing, fabricating, etc., operations it is further required that the feed machine be so synchronized with the work machine that the feed machine advances given lengths of the material to the work machine and that these given lengths fall within a range of lengths and have a high degree of consistent accuracy in length between successive lengths. Preferably, the degree of accuracy between successive lengths should be about ±0.020" in 5 feet so that the product from the line meets close size and dimension specifications.

Heretofore, such lines have relied upon a combination of counting units and clutches to effect variations in lengths of the material fed to the work machine between successive work operations, or upon a combination of a single differential unit, a variable speed unit and elliptical gears. These combinations have been only partially successful in achievement of accuracy of length between successive lengths fed to the work machine and to the latter combination, inaccuracies occur due to limitations of the existing forms of variable speed gears used due to slip in various clutch systems. Additionally, they are expensive and require substantial maintenance costs.

Some of these combinations have a further shortcoming in that they generate sharp and substantial accelerations and decelerations in speed to effect the changes in length of material which is fed to the work machine. Such accelerations and decelerations are destructive to the machines and generate considerable maintenance work and high costs.

My invention relates to a variable speed gear drive which comprises a rotatable axle and a differential mounted upon this axle and including a differential case disposed for rotation with the axle. The differential further includes first and second side gear means which are rotatable independently of the axle. In combination therewith are first and second output drive shafts. The first drive shaft and one of the side gear means is in a gear train connection and the second drive shaft and the other of the side gear means is in a second gear train connection. One of the drive shafts and one of the side gear means is disposed for operative connection to a source of power for drivingly rotating same. Operatively connected to one of the axle or the differential case is a driving means which effects a change in amount of rotation of same and thereby a change in amount of rotation of the side gear means in gear train connection with that output drive shaft not in operative connection with the source of power to produce a change in speed of said that output drive shaft during a first part of a revolution of same. The two output drive shafts are in synchronism during a second part of a revolution of same and the driving means is operative only during a part of a revolution of the two output drive shafts.

The change in amount of rotation of the side gear means is an increase or decrease in speed thereof as a result of which occurs a change in speed of said that output drive shaft during at least a part of a revolution of same.

In one embodiment of my invention the driving means is a second differential rotatably mounted and in operative connection with the axle. This second differential includes a case and first and second side gear means rotatable independently of the axle. Each of these side gear means of the second differential has a one-way clutch means disposed for rotating same. Connected to the one-way clutch means is an operable means for rotating the one-way clutch means a given amount during a part of a revolution of one of the output drive shafts. This operable means is adjustable to effect a change in amount the one-way clutch means rotate during a part of a revolution of the output drive shaft.

In another embodiment of my invention the second differential is so arranged that its output is delivered to one of the side gears of the first differential instead of to the axle or case thereof. Of course, the gear train connections which include the two output drive shafts are appropriately changed to take this into account.

In the accompanying drawings I have shown preferred embodiments of my invention in which:

FIGURE 1 is a plan view of my invention which uses a single differential in gear train connection with two output drive shafts and is applied to a shear line;

FIGURE 2 is a plan view of a modification of the invention of FIGURE 5; and

FIGURE 3 is a schematic plan view of a second embodiment of my invention which uses two differentials, one of which is in gear train connection with two output drive shafts and is applied to a shear line.

FIGURE 1 shows my invention which has two output drive shafts 38 and 39 with the shaft 39 drivingly connected to a shear 40 and the shaft 38 drivingly connected to a pinch roll stand 41 which feeds metal strip to the shear. An input drive shaft 42 with a gear 43 keyed thereto rotates the shaft 39 through a gear 44 carried thereby and imparts to the shaft 39 an r.p.m. which is controlled by its speed.

The gear 44 of shaft 39 is in gear train connection with one side gear 45 of a differential 46 mounted upon an axle 47 and rotatable therewith. The side gear 45 is rotatable independently of the axle 47 and the differential includes a case 48 which revolves with the axle 47 and a second side gear 49 also rotatable independently of the axle. The two side gears turn in opposite directions to one another and this second side gear 49 meshes with a gear 50 keyed to the shaft 38 to form a second gear train connection. Thus, the shaft 38 is driven by input shaft 42 through the differential 46 and the second side gear 49.

Connected to the axle 47 through a one-way clutch 51 or form sprag mounted thereon is a reciprocating rack 52 which engages teeth disposed on the periphery of the one-way clutch 51. A cylinder motor 53 operates the rack 52 upon receipt of a signal from a signal generator 54 actuated by the shaft 39 whereby the rack rotates the axle 47 a given amount during a part of a rotation of the shaft 39. Since the rack 52 engages the one-way clutch 51, the axle 47 is rotated thereby during only one part of the reciprocating stroke of the rack and is not turned during the other part of the stroke of this rack. A backstop member 55 connected to the axle 47 assures that the axle turns in only one direction.

By reversing the direction of the teeth in the one-way clutch or form sprag and the back stop member, the axle 47 can be rotated in the opposite direction by the rack 52. Operation of the rack 52 effects a change in speed of rotation of the shaft 38 by addition or subtraction of motion to the axle 47 through the second side gear 49 and the gear 50. Whether the speed of the shaft 38 is increased or decreased depends upon the tooth setting of the one-way clutch and back stop which determines the direction motion is applied to the axle 47 by the rack 52. Accordingly, the amount of strip fed by the pinch roll stand to the shear during a part of a revolution or a plurality of revolutions of the shaft 44 can be increased and decreased. Also, the length of the stroke the rack 52 can be changed through regulation of the cylinder motor 53 or the connection of the rack 52 to the one-way clutch 51 or by any other suitable means. In this way, further control over the amount of the strip delivered to the shear during one or more revolutions of the shaft 38 is achieved.

Since the side gear 45 is in gear train connection with the gear 44 and the gear 43 of the input shaft 42, the r.p.m. of shaft 39 is unaffected by operation of the rack 52 and all of the input motion to the axle 47 from the rack 52 is delivered to the shaft 38.

When the rack 52 is not operated, the two shafts 38 and 39 are synchronized by the two gear train connections whereby the rate at which strip is fed to the shear 40 by the pinch roll stand 41 matches the cutting of a length of metal from the strip. Of course, during the period of cutting by the shear 40, the cylinder motor 53 is not operated but is actuated at those times when the shear does not make a cut.

A brake 56 which travels into and out of engagement with the axle 47 is under the control of the shaft 39 and is advanced into engagement with the axle 47 when the shear 40 makes a cut to prevent rotation of the differential and thereby assures synchronism of the pinch roll stand 41 with the shear 40 during cut of a length from the metal strip fed to the shear by the pinch roll stand. At those times when a cut is not made, the brake 56 is disengaged from the axle 47 so that the rack can add or subtract motion to the axle 47 depending upon the setting of the one-way clutch and back stop and thereby to the second side gear 49.

A modification of the embodiment of FIGURE 1 connects the rack to one of the side gears of the differential 46 whereby the case 48 with a ring gear mounted thereon or a gear keyed to the axle 47 is in gear train connection with either shaft 38 or shaft 39. The other side gear of the diffrential is then in gear train connection with the other of the two shafts 38 and 39.

FIGURE 2 shows a second embodiment of my invention which uses many of the elements of the embodiment of FIGURE 1 in the same arrangement. Accordingly, the same reference numerals of FIGURE 1 identify similar elements in the embodiment of FIGURE 2 and the operation of the embodiment of FIGURE 2 is substantially the same as the operation of the embodiment of FIGURE 1 except for the rack 52, cylinder motor 53 and signal generator 54. These last three components have been replaced by a pair of one-way clutches 57 and 58 mounted upon the axle 47 and operated by a drive unit 59. Also, the shaft 39 is directly driven by a motor 60.

The drive unit 59 comprises a stub shaft 61 which carries a gear 62 and which is turned by a gear 63 keyed to the shaft 39. Disposed upon the stub shaft 61 and rotatable therewith is a first disk 64 and a second disk 65. A crank arm 66 joins disk 64 to one-way clutch 57 and crank arm 67 connects disk 65 to the one-way clutch 58 whereby rotation of the stub shaft 61 imparts a reciprocating stroke to each crank arm and produces a turning of the one-way clutches and consequently the axle 47. The one-way clutches are so arranged that when operated by the drive unit 59 both generate torque which revolves the axle 47 in the same direction. Accordingly, one part of the reciprocating stroke of each crank imparts motion to the one-way clutch while the return part of the stroke does not turn the one-way clutches.

As shown in FIGURE 2, the connection of the crank arm 66 to its one-way clutch 57 is offset or advanced circumferentially of the axle 47 relative to the connection of the crank arm 67 to the one-way clutch 58. The disposition of the gear 63 and the drive unit 59 is such that the one-way clutches 57 and 58 are operated during a part of a revolution of the shaft 39. Accordingly, this connection of the crank arms to the one-way clutches provides that the axle 47 is rotated during a greater part of a revolution of the shaft 39 than otherwise obtainable. Thus an increased amount of motion can be applied to the axle 47 and thereby produce a greater control over an increase or decrease in speed of the shaft 38 through operation of the differential 46 and its side gear 49 without substantial acceleration which would be required if the motion were applied during 180° of a revolution of the shaft 39.

The backstop member 55 and the brake 56 perform the same functions in the embodiment of FIGURE 2 as in the embodiment of FIGURE 1.

A modification of the embodiment of FIGURE 2 applies the output of the two one-way clutches 57 and 58 to one of the side gears of the differential 46. This is achieved by mounting the two one-way clutches upon a second axle separate from the axle 47 and placing the second axle in gear train connection with one of the two side gears 45 and 49. Then, shaft 39 is disposed in gear train connection with the axle 47 and shaft 38 is arranged in gear train connection with the other side gear of the differential 46.

In FIGURE 3 I have shown a third embodiment of my invention which has two output drive shafts 38 and 39 of which shaft 39 is drivingly connected to a metal shear 40 and the other shaft 38 is drivingly connected to a pinch roll stand 41. Metal strip is delivered from a coil by the pinch roll stand in the shear and operation of the shear and the pinch roll stand are substantially similar to those of the embodiment of FIGURE 5. Corresponding reference numerals identify similar elements and components of the embodiment of FIGURE 3.

A conventional motor 60 coupled to the shaft 39 applies torque thereto and thereby powers the shear 40. The shaft 38 receives driving torque through a gear 44 keyed thereto and in gear train connection with a first side gear 45 of a first differential 46 mounted upon a rotatable axle 47. A second side gear 49 of the first differential is in gear train connection with a gear 50 carried by the shaft 38. The side gears and the case of this first differential 46 and the gear train connection of the two shafts 38 and 39 are the same as those of the embodiments of FIGURES 1 and 2.

Disposed upon the axle 47 is a second differential 68 whose case 69 rotates therewith and which includes first and second side gears 70 and 71 each rotatable independently of the axle 47. The side gear 70 mounts a one-way clutch 57 and the side gear 71 mounts a one-way clutch 58 with both one-way clutches arranged for rotating their respective side gears in the same direction. As shown in FIGURE 3, the one-way clutches are operated by a drive unit 59 whose output is applied to one-way clutch 57 by crank arm 66 and to one-way clutch 58 by crank arm 67.

The drive unit is the same as that of the embodiment of FIGURE 2 and, therefore, need not be further described. This drive unit 59 rotates the one-way clutches 57 and 58 a given amount during a part of a revolution of the shaft 39 or during a plurality of revolutions of the shaft 39. Like the crank arms of FIGURE 2, the crank arms of FIGURE 3 are adjustable to increase or decrease the amount each one-way clutch is rotated during a part of a revolution of the shaft 39.

The connection of one crank arm to its one-wap clutch is offset relative to the connection of the other arm to its one-way clutch so that rotation of one side gear occurs during a portion of a revolution of the shaft 39 which is not identical to the portion of a revolution of the shaft during which the other side gear is turned. Accordingly, the output motion of this second differential 68 resulting from operation of the one-way clutches adds motion to or subtracts motion from the axle 47 depending upon the direction of rotation of the case 69 relative to the axle 47. Then, in turn the side gear 49 of the first differential 46 and the shaft 38 which drives the pinch roll stand has motion added to or subtracted therefrom. Thus the r.p.m. of this shaft 38 is increased or decreased similarly to that of the r.p.m. of the shaft 38 of the embodiment of FIGURE 1.

The side gears 70 and 71 of differential 68 have second one-way or backstop clutches 70a and 71a respectively which prevent any rotation of the side gears 70 and 71 in a direction reverse to that in which motion is applied to the side gears through crank arms 66 and 67 and the other one-way clutches 70 and 71.

Use of the second differential 68 is advantageous for increasing or decreasing the speed of shaft 38 for the second differential can receive motion applied to its side gears simultaneously and add the motion together to provide an output motion which is the sum of the two input motions. Accordingly, within limits the second differential can substantially increase the amount of motion which can be added to or subtracted from the shaft 38. Furthermore, the second differential achieves a steady acceleration and/or deceleration and thereby avoids sudden changes in acceleration and deceleration which can be harmful and damaging to the drive and machinery connected thereto.

Like the embodiment of FIGURE 1, the embodiment of FIGURE 3 includes a brake 56 which engages the axle 47 during performance of the cutting operation to assure that the two shafts are synchronized and the speed of the strip delivered by the pinch roll stand to the shear matches the speed of the cutting operation. Also, like the embodiment of FIGURE 1, the r.p.m. of shaft 39 of the embodiment of FIGURE 3 is regulated by the motor and is unaffected by actuation of the one-way clutches 70 and 71 and the output of the second differential 68.

The axle 47 has a brake 47a mounted thereon for imparting a constant drag upon the axle 47 when subtracting motion from the shaft 38. The brake 47a is spring loaded and thereby locates the axle 47 against a backstop clutch (not shown) during the period when no motion is applied to the axle 47.

A modification of the embodiment of FIGURE 3 delivers the output of the second differential 68 to one of the side gears of the first differential through a gear train connection therewith or by any other suitable means. Accordingly, the case of the first differential with a ring gear thereon or a gear keyed to the axle 47 is in gear train connection with either shaft 38 or 39. The other side gear of the first differential is then in gear train connection with the other of the shafts 38 and 39.

Although the embodiments of FIGURES 1-3 have been shown and described with the shaft 38 connected to the pinch roll stand 41 and accelerated or decelerated to meet a given requirement this shaft 38 can be turned at a speed regulated by the motor 60 or the input shaft 42. Then the shaft 39 coupled to the shear 40 is accelerated or decelerated in the same manner as the shaft 38 joined to the pinch roll stand. Additionally, both shafts can have their r.p.m. accelerated or decelerated through proper gear train connections to the output of one or more differentials.

In addition to the type of differential shown in FIGURES 1-3 inclusive, I can satisfactorily use that type of differential which has the case rotatably mounted upon the side gears and not upon an axle.

My invention effects an important advantage; namely, that within limits it delivers variations in the lengths of portions of material fed to a work machine and assures a consistent and high degree of accuracy of length between successive portions of the material. This is achieved simply, efficiently and economically and does not require excessive expenditures for machinery or for complicated devices.

While I have shown and described preferred embodiments of my inventions, it may be otherwise embodied within the scope of the appended claims.

I claim:

1. A gear drive comprising a first differential including first and second side gear means and a rotatable differential case, first and second output drive shafts, said first drive shaft and one of said side gear means of said first differential being in gear train connection, said second drive shaft and the other of said side gear means of said first differential being in gear train connection, one of said drive shafts and of one of said side gear means of said first differential being disposed for operative connection to a source of power for drivingly rotating same, a second differential including a rotatable case and first and second side gear means, said second differential being in operative connection with said first differential, each of said side gear means of said second differential having a means disposed for rotating same, operable means connected to said side gear rotating means of said second differential for rotating same a given amount during a part of a revolution of one of said output drive shafts, said operable means being adjustable to effect a change in amount said side gear rotating means turn during a part of a revolution of said one output drive shaft and effecting a change in amount of rotation of said side gear means of said first differential in gear train connection with that output drive shaft not in operative connection with said source of power to produce a change in speed of at least one of said output drive shafts during at least a part of a revolution of same.

2. The drive of claim 1 characterized by the connection of one of said operable means to its side gear rotating means being offset circumferentially of the connection of said operable means to the other side gear rotating means.

3. A gear drive comprising a first differential including a rotatable differential case and first and second side gear means, first and second output drive shafts, a gear means rotatable with said first differential case, said first drive shaft and one of said gear means rotatable with said first differential case and of one of said side gear means of said first differential being in gear train connection, said second drive shaft and the other of said gear means rotatable with said first differential case and of said one of said side gear means of said first differential being in gear train connection, one of said drive shafts, of said gear means rotatable with said first case and of one of said side gear means of said first differential being disposed for operative connection to a source of power for drivingly rotating same, a second differential including a rotatable differential case and first and second side gear means, said second differential case being operatively connected to said other side gear means of said first differential not disposed for operative connection to a source of power, each of said side gear means of said second differential having means for rotating same, operable means connected to each second differential rotating means for turning same a given amount during a part of a revolution of one of said output drive shafts, said operable means being adjustable to effect a change in amount said second differential side gears rotate during a part of a revolution of said one output drive shaft, rotation of said second differential side gear means effecting a change in amount of rotation of said other side gear means of said first differential and thereby producing a change in speed of that output drive shaft not in operative connection with said source of power during at least a portion of the revolution of said that output drive shaft.

4. The drive of claim 3 characterized by the connection of said operable means to one of said second differential side gear rotating means being offset relative to the connection of the operable means to the other of said second differential side gear rotating means.

5. A gear drive comprising a differential including first and second side gear means and a rotatable case, first and second output drive shafts, said first drive shaft and one of said side gear means being in gear train connection, said second drive shaft and the other of said side gear means being in gear train connection, one of said drive shafts and of said side gear means being disposed for connection to a source of power for drivingly rotating same, driving means operatively connected to said case for effecting a change in amount of rotation of same and thereby a change in amount of rotation of said side gear means in gear train connection with that output drive shaft not in operative connection with said source of power to produce a change in speed of that one of said output drive shafts during a first part of a revolution of same, said driving means comprising one-way clutch means connected to said case for rotating same in a common direction, adjustable crank means connected to said clutch means for rotating said clutch means a given amount during the part of a revolution of one of said output drive shafts, regulation of said crank means effecting a change in the amount said clutch means turns during a revolution of said one output drive shaft, said two output drive shafts being in synchronism during a second part of a revolution of same, said driving means being operative only during a part of a revolution of said output drive shafts.

6. A gear drive comprising a differential including first and second side gear means and a rotatable differential case, a gear means rotatable with said differential case, first and second output drive shafts, said first drive shaft and one of said gear means and of one of said side gear means being in gear train connection, said second drive shaft and the other of said gear means and of one of said side gear means being in gear train connection, one of said drive shafts, of said gear means and of one of said drive gear means being disposed for operative connection to a source of power for drivingly rotating same, driving means operatively connected to the other side gear means not disposed for operative connection to a source of power for effecting a change in amount of rotation of same and thereby produce a change in speed of that output drive shaft not in operative connection with said source of power during a first part of a revolution of said that output drive shaft, said driving means comprising a pair of one-way clutches disposed for rotating said other side gear means in a common direction, a pair of adjustable cranks, one of which is connected to one of said clutches and the other of which is connected to the other of said clutches for turning same, said cranks being adjustable to effect a change in amount the clutches turn during a part of a revolution of said one output drive shaft, said two output drive shafts being in synchronism during a second part of a revolution of same, said driving means being operative only during a part of a revolution of said output drive shafts.

7. A gear drive comprising an epicyclic gear unit including first and second main gear means and a rotatable gear mounting, first and second output drive shafts, said first drive shaft and one of said main gear means being in gear train connection, said second drive shaft and the other of said main gear means being in gear train connection, one of said drive shafts and one of said main gear means being disposed for connection to a source of power for drivingly rotating the same, driving means operatively connected to said gear mounting for effecting a change in amount of rotation of the same and thereby effecting a change in amount of rotation of said main gear means in gear train connection with that output drive shaft not in operative connection with said source of power to produce a change in speed of that one of said output drive shafts during a first part of a revolution of same, said driving means comprising at least one one-way clutch means connected to the gear mounting for rotating same in a common direction, and adjustable crank means connected to said one-way clutch means for rotating said gear mounting a given amount during a part of a revolution of one of said output drive shafts, regulation of said crank means effecting a change in the amount said clutch means turns during a revolution of said one output drive shaft, said two output drive shafts being in synchronism during a second part of a revolution of same, said driving means being operative only during a part of a revolution of said output drive shafts.

8. A gear drive comprising a rotatable axle, a differential mounted upon said axle and including a differential case disposed for rotation with said axle, said differential further including first and second side gear means rotatable independently of said axle, first and second output drive shafts, said first drive shaft and one of said side gear means being in gear train connection, said second drive shaft and the other of said side gear means being in gear train connection, one of said drive shafts and of said side gear means being disposed for operative connection to a source of power for drivingly rotating same, said driving means operatively connected to one of said axle and of said differential case for effecting a change in amount of rotation of same and thereby a change in amount of rotation of said side gear means in gear train connection with that output drive shaft not in operative connection with said source of power to produce a change in speed of said that output drive shaft during a first part of a revolution of same, driving means comprising a one-way clutch mounted upon said axle for rotating same, operable means connected to said one-way clutch means through adjustable linkage means for rotating said one-way clutch means a given amount during a part of a revolution of one of said output drive shafts, regulation of said adjustable linkage means effecting a change in amount said one-way clutch rotates during a revolution of said one output drive shaft, said two output drive shafts being in synchronism during a second part of a revolution of same, said driving means being operative only during a part of a revolution of said output drive shafts.

9. The drive of claim 8 characterized by said driving means comprising a pair of one-way clutch means mounted upon said axle for rotating same, a pair of operable means each connected to one of said one-way clutch means through adjustable linkage means for rotating said one-way clutch means a given amount during a part of a revolution of one of said output drive shafts, regulation of said adjustable linkage means effecting a change in the amount said one-way clutches rotate during a revolution of said one output drive shaft, the connection of one adjustable linkage means to its one-way clutch means being offset circumferentially of said axle relative to the connection of the other adjustable linkage means to its one-way clutch means.

10. The drive of claim 1 and including brake means movable into and out of engagement with the first differential case for controlling rotation of said first differential case other than that produced by said second differential, said brake means being operatively connected to and under the control of that output shaft in operative connection with the source of power whereby the brake means is out of engagement during the first part of a revolution of that output shaft to which the brake means is connected and is advanced into engagement with said first differential case during the part of a revolution during which the output shafts are in synchronism.

11. The drive of claim 3 and including brake means movable into and out of engagement with said other side gear means of said first differential for controlling rotation of said other side gear means of said first differential other than that produced by said second differential, said brake means being operatively connected to and under the control of that output shaft in operative connection with the source of power whereby the brake means is out of engagement during the first part of a revolution of that output shaft to which the brake means is connected and is advanced into engagement with said other side gear means of said first differential during the part of a revolution during which the output shafts are in synchronism.

12. The drive of claim 5, and including brake means movable into and out of engagement with the case for controlling rotation of the case other than that produced by the driving means, said brake means being operatively connected to and under the control of that output shaft in operative connection with the source of power whereby the brake means is out of engagement during the first part of a revolution of that output shaft to which the brake means is connected and is advanced into engagement with the case during the part of a revolution during which the output shafts are in synchronism.

13. The drive of claim 7 and including brake means movable into and out of engagement with the gear mounting for controlling rotation of the gear mounting other than that produced by the driving means, said brake means being operatively connected to and under the control of that output shaft in operative connection with the source of power whereby the brake means is out of engagement during the first part of a revolution of that output shaft to which the brake means is connected and is advanced into an engagement with the gear mounting during the part of a revolution during which the output shafts are in synchronism.

References Cited
UNITED STATES PATENTS

| | | | |
|---|---|---|---|
| 2,201,581 | 5/1940 | Hallden | 83—298 |
| 3,156,150 | 11/1964 | Sarka | 83—313 X |

RALPH D. BLAKESLEE, *Primary Examiner.*